(12) United States Patent
Kim et al.

(10) Patent No.: US 8,532,146 B2
(45) Date of Patent: Sep. 10, 2013

(54) DIGITAL BROADCAST TRANSMISSION/RECEPTION APPARATUS FOR RAPID CHANNEL CHANGE

(75) Inventors: Han-Sang Kim, Seoul (KR);
Kwan-Woong Song, Seongnam-si (KR);
Young-Hun Joo, Yongin-si (KR);
Yong-Deok Kim, Seoul (KR);
Kyung-Ho Chae, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1174 days.

(21) Appl. No.: 11/505,082

(22) Filed: Aug. 16, 2006

(65) Prior Publication Data

US 2007/0130612 A1 Jun. 7, 2007

(30) Foreign Application Priority Data

Dec. 5, 2005 (KR) .................. 10-2005-0117723

(51) Int. Cl.
*H04H 20/28* (2008.01)
(52) U.S. Cl.
USPC ........................................ 370/486
(58) Field of Classification Search
USPC .............. 370/486, 229; 725/38, 39, 116, 725/131, 135, 50; 348/731; 710/38
See application file for complete search history.

(56) References Cited

U.S. PATENT DOCUMENTS

| | | | |
|---|---|---|---|
| 6,031,577 A * | 2/2000 | Ozkan et al. ................. | 348/465 |
| 6,414,720 B1 * | 7/2002 | Tsukidate et al. ............ | 348/469 |
| 6,684,271 B1 * | 1/2004 | Dahlgren ..................... | 710/38 |
| 7,086,076 B1 * | 8/2006 | Park ............................. | 725/50 |
| 7,873,110 B2 * | 1/2011 | Bidnur et al. ............. | 375/240.25 |
| 2004/0181813 A1 * | 9/2004 | Ota et al. .................... | 725/131 |
| 2005/0163163 A1 | 7/2005 | Kim et al. | |

FOREIGN PATENT DOCUMENTS

| | | |
|---|---|---|
| EP | 0966121 A2 | 12/1999 |
| JP | 2003-23578 | 1/2003 |
| KR | 2001-36163 | 5/2001 |
| KR | 2001-81402 | 8/2001 |
| WO | WO 03/088646 | 10/2003 |

OTHER PUBLICATIONS

International Telecommunication Union; "Information Technology—Generic Coding of Moving Pictures and Associated Audio Information: Systems;" H.222.0 ITU-T Standard Superseded; Jul. 10, 1995; XP017401293.

* cited by examiner

*Primary Examiner* — Mark Rinehart
*Assistant Examiner* — Mohammad Anwar
(74) *Attorney, Agent, or Firm* — CHA & Reiter, LLC

(57) ABSTRACT

Disclosed is a digital broadcasting transmission apparatus for rapid channel change to an A/V stream of a predetermined channel, the apparatus including a program specific information (PSI) generation unit for generating PSI of the A/V stream, a PSI length detection unit for detecting a length of the PSI generated by the PSI generation unit; a channel information (CI) generation unit for generating CI which includes PSI of all digital broadcasting channels input to the digital broadcasting transmission apparatus, a CI insertion unit for dividing and inserting the CI generated by the CI generation unit into a PSI transmission area generated by the PSI generation unit, according to the length information detected by the PSI length detection unit, and a transport stream (TS) multiplexing unit for multiplexing and outputting the A/V stream and an output of the CI insertion unit.

13 Claims, 7 Drawing Sheets

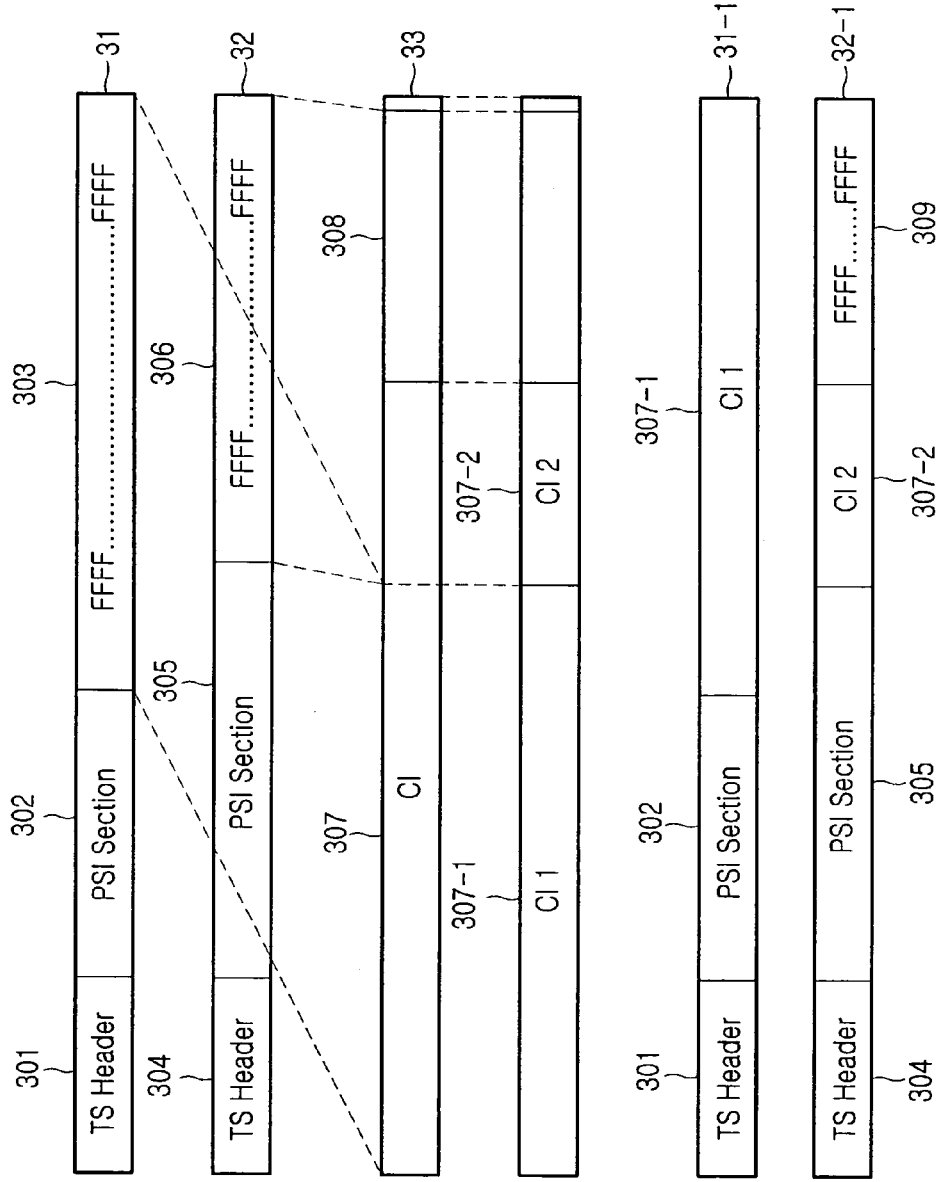

| channel | PCR PID | Video PID | Audio PID |
|---|---|---|---|
| 1-1 | 11 | 11 | 12 |
| 1-2 | 21 |  | 21 |
| 2-1 | 31 | 31 | 32 |
| 3-1 | ... | ... | ... |
|  | ... | ... | ... |

FIG.4

DIGITAL BROADCAST TRANSMISSION/RECEPTION APPARATUS FOR RAPID CHANNEL CHANGE

CLAIM OF PRIORITY

This application claims the benefit of the earlier filing date, under 35 U.S.C. 119(a), to that patent application entitled "Digital Broadcast Transmission/Reception Apparatus for Rapid Channel Change" filed in the Korean Intellectual Property Office on Dec. 5, 2005 and assigned Serial No. 2005-117723, the entire contents of which are incorporated herein by reference.

BACKGROUND OF THE INVENTION

1. Field of the Invention

The present invention relates digital multimedia broadcast, and more particularly to a digital broadcast transmission/reception apparatus with rapid channel change through reduction of the parsing time for program specific information (PSI).

2. Description of the Related Art

An analog television displays a corresponding broadcast of a channel when a physical channel change occurs, but a digital television requires a delay of at least two seconds until it displays a corresponding broadcast of a channel when a physical channel change occurs. Such a time delay in a channel change is regarded as a weak point of digital broadcasting, as compared with analog broadcasting.

This delay time in the digital television is the sum of channel tuning time, PSI parsing time, and Audio/Video (A/V) decoding time. The first factor "channel tuning time" is determined according to the tuning speed of a physical tuner, the second factor "parsing time" is determined according to a parsing algorithm, and the third factor "A/V decoding time" is determined according to the setup of a physical buffer Video Buffering Verifier (VBV) and I(Intra)-frame detection.

FIG. 1 is a block diagram illustrating the construction of a PSI parsing unit in a conventional digital broadcasting reception apparatus.

According to the conventional digital broadcasting reception apparatus, the PSI parsing unit 100 extracts a Program Association Table (PAT) 103 and a Program Map Table (PMT 105) by demultiplexing a digital broadcast received through a tuner 101, and transmits a relevant elementary stream (ES) to a decoder 107, thereby providing a digital broadcast to the user.

In more detail, the PSI parsing unit 100 first extracts the PAT 103 through a first demultiplexer 102, and demultiplexes the output of the first demultiplexer 102 in a second demultiplexer 104 using the information of the PAT 103, thereby extracting the PMT 105. Then, the PSI parsing unit 100 extracts an elementary stream (ES) in a third demultiplexer 106 using the PMT 105. Such PSI parsing causes a time delay upon a channel change, so research is being conducted to reduce such a PSI parsing time.

Generally, in a digital television, when a physical channel change occurs, PAT parsing, PMT parsing, and filtering procedures are sequentially performed before a corresponding digital broadcast is displayed. This means that a channel change time is extended. Various methods have been proposed in order to reduce the PSI parsing time. However, it is not easy to apply such methods due to several reasons; for example, these methods may require additional hardware.

There has been proposed a method for improving a channel change speed in a digital broadcasting receiver (set-top box), in which a tuner is additionally installed in a reception terminal so as to scan all channels and to store PSI obtained through the scanning in a memory. However, this method has a problem in that a separate tuner must be installed in the reception terminal. Another proposed method for removing the searching time for a PSI packet in digital multimedia broadcasting (DMB), in which a transport stream (TS) is buffered in a reception terminal during about two seconds, and then a PAT and a PMT included in the buffered data are parsed, thereby reducing a delay time. However, since this method unnecessarily buffers the stream in the reception terminal during two seconds, a longer time delay may be incurred, as compared with a general algorithm which parses PSI without such a buffering process.

Third, there has been proposed a method for reducing an initial starting time of a DMB terminal through PMT search, in which a search is performed in order to find a TS whose header and payload includes predetermined bits identical to those of a PMT. Although this method may have an effect in a single channel for PMT, this method requires longer waiting time and PAT parsing time for all channels under a multichannel environment.

SUMMARY OF THE INVENTION

Accordingly, the present invention has been made to solve the above-mentioned problems occurring in the prior art and provides additional advantages, by providing a digital broadcasting transmission/reception apparatus for rapid channel change, in which a digital broadcasting transmission terminal transmits packet identifier (PID) information of all channels together with a transport stream (TS) for each channel based on the fact that the PID of digital broadcast streams of each broadcasting station are constantly maintained, thereby solving the longer channel change time as compared to that of analog televisions.

To accomplish this object, in accordance with one aspect of the present invention, there is provided a digital broadcasting transmission apparatus for rapid channel change to an A/V stream of a predetermined channel, the apparatus including a program specific information (PSI) generation unit for generating PSI of the A/V stream, a PSI length detection unit for detecting a length of the PSI generated by the PSI generation unit, a channel information (CI) generation unit for generating CI which includes PSI of all digital broadcasting channels input to the digital broadcasting transmission apparatus, a CI insertion unit for dividing and inserting the CI generated by the CI generation unit into a PSI transmission area generated by the PSI generation unit according to the length information detected by the PSI length detection unit and a transport stream (TS) multiplexing unit for multiplexing and outputting the A/V stream and an output of the CI insertion unit.

In accordance with another aspect of the present invention, there is provided a digital broadcasting reception apparatus for rapid channel change in a digital broadcasting system in which channel information (CI) is transmitted, the apparatus including a tuner for receiving a digital broadcasting transport stream (TS) transmitted from a transmission apparatus; a CI extraction unit for extracting the CI from the digital broadcasting TS received through the tuner; a CI parser for parsing the CI extracted by the CI extraction unit, a program specific information (PSI) parser for receiving a remaining information, except for the CI extracted by the CI extraction unit, parsing PSI, and outputting an A/V stream; a CI processing unit for processing the CI parsed by the CI parser; and a storage unit for storing the CI processed by the CI processing unit as a PSI lookup table, wherein the CI processing unit retrieves the lookup table stored in the storage unit and transmits the lookup table to the PSI parser when there is a physical channel change through the tuner.

In accordance with still another aspect of the present invention, there is provided a digital broadcasting transmission apparatus for rapid channel change to an A/V stream of a predetermined channel, the apparatus including a program specific information (PSI) generation unit for generating PSI of the A/V stream, a channel information (CI) generation unit for generating CI which includes PSI of all digital broadcasting channels input to the digital broadcasting transmission apparatus, a CI insertion unit for inserting the CI generated by the CI generation unit, a CI transport stream (CI TS) generation unit for generating an independent transmission channel from the CI inserted through the CI insertion unit, and a TS multiplexing unit for multiplexing and transmitting outputs of the A/V stream, the PSI generation unit, and the CI TS generation unit.

BRIEF DESCRIPTION OF THE DRAWINGS

The above features and advantages of the present invention will be more apparent from the following detailed description taken in conjunction with the accompanying drawings, in which:

FIGS. 3A to 3D represent block diagrams for explaining CI insertion in a digital broadcasting transmission apparatus for rapid channel change according to the first embodiment of the present invention;

FIG. 4 represents a view illustrating a PID lookup table stored in the storage unit of the digital broadcasting reception apparatus for rapid channel change according to the first embodiment of the present invention;

DETAILED DESCRIPTION OF THE INVENTION

Hereinafter, an embodiment of the present invention will be described with reference to the accompanying drawings. For the purposes of clarity and simplicity, a detailed description of known functions and configurations incorporated herein will be omitted when it may obscure the subject matter of the present invention.

The present invention proposes a method for reducing a time delay caused in a program specific information (PSI) parsing procedure in such a manner that a digital broadcasting transmission terminal inserts packet identifier (PID) information of all transmission channels into a transmission stream (TS) for each channel, and a reception terminal parses and stores the PID information of all channels in a storage unit, thereby reducing a time period for a PSI parsing in the future.

Figure 1:
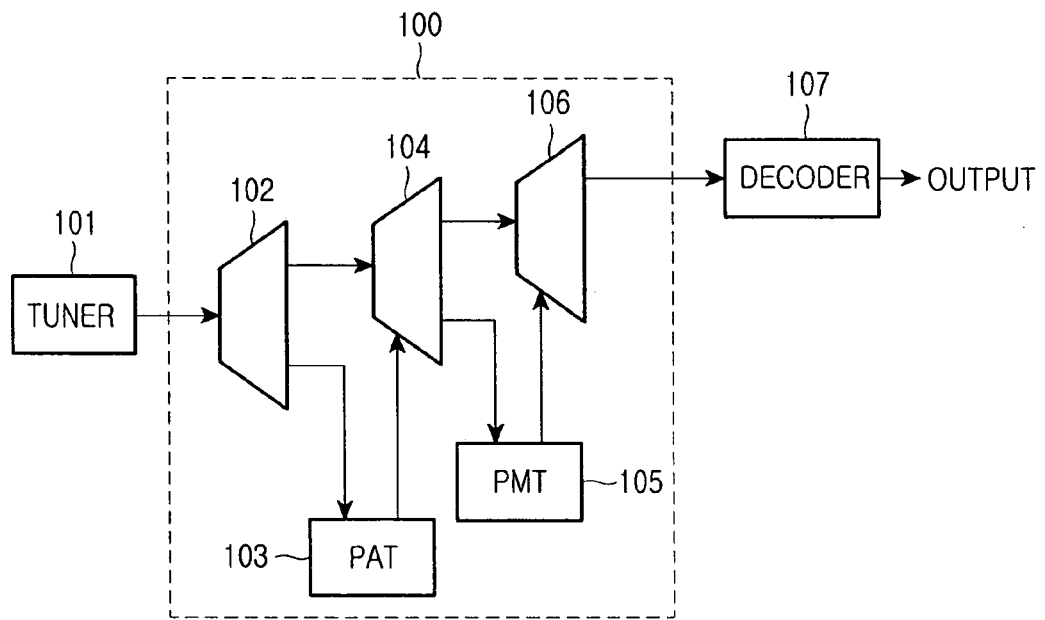
FIG. 1 presents a block diagram illustrating the construction of a PSI parsing unit in a conventional digital broadcasting reception apparatus.
Figure 2A:
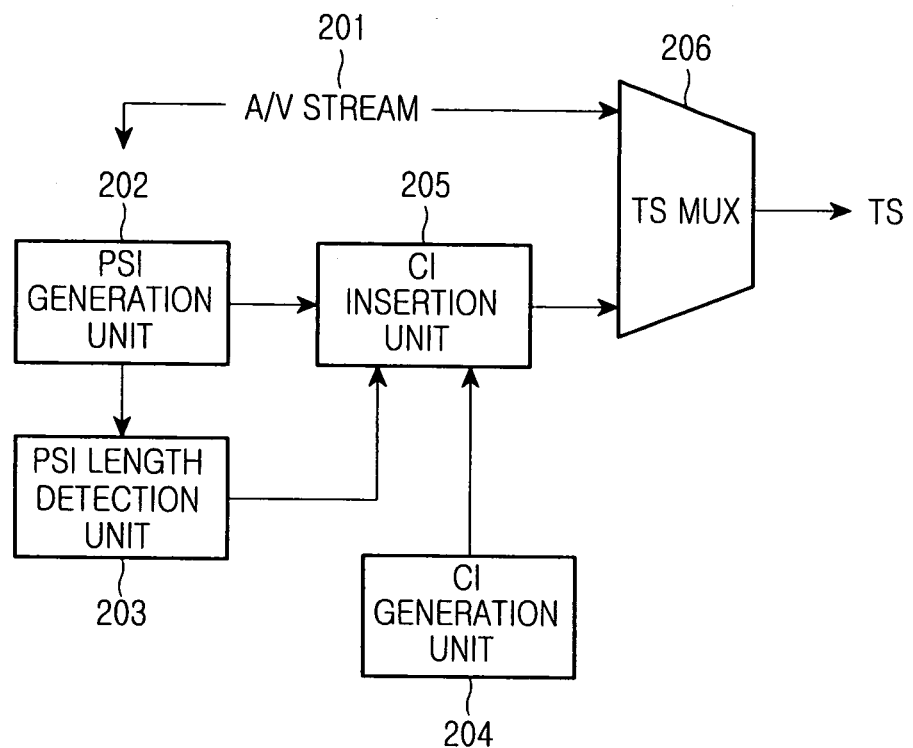
FIGS. 2A and 2B represent block diagrams illustrating the construction of a digital broadcasting transmission/reception apparatus for rapid channel change according to a first embodiment of the present invention.
Figure 2B:
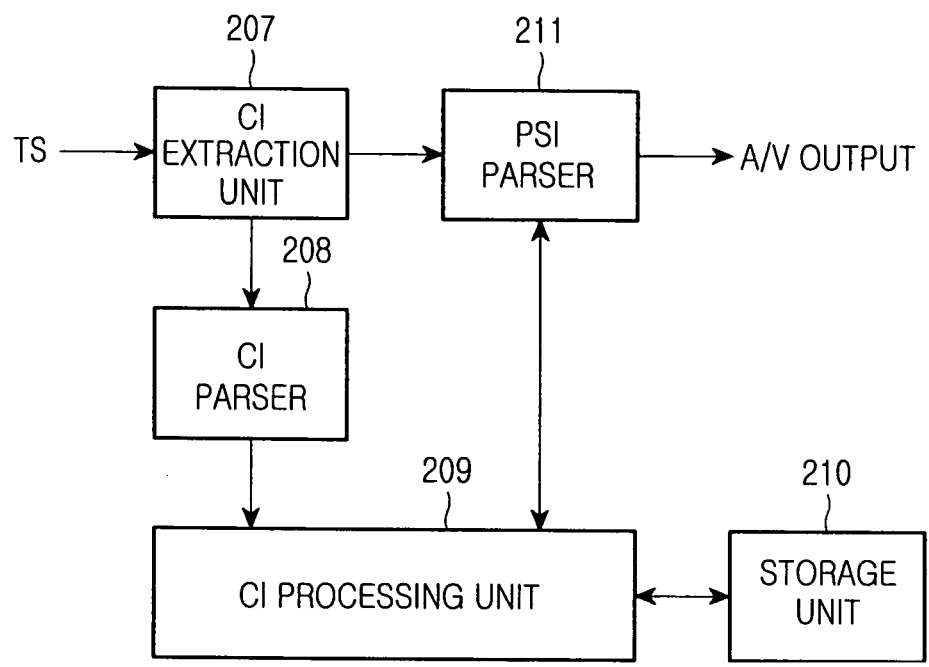

FIGS. 2A and 2B represent block diagrams illustrating the construction of a digital broadcasting transmission and reception apparatus, respectively, for rapid channel change according to a first embodiment of the present invention.

FIG. 2A represents a block diagram illustrating the construction of the digital broadcasting transmission apparatus for rapid channel change according to the first embodiment of the present invention. The digital broadcasting transmission apparatus receives an A/V stream 201 of a predetermined channel, a PSI generation unit 202, a PSI length detection unit 203, a channel information (CI) generation unit 204, a CI insertion unit 205, and a TS multiplexing unit 206. The PSI generation unit 202 generates PSI of the A/V stream 201, and the PSI length detection unit 203 detects the length of the PSI generated by the PSI generation unit 202. The CI generation unit 204 generates CI including PSI of all digital broadcasting channels which are input to the digital broadcasting transmission apparatus. The CI insertion unit 205 divides and inserts the CI generated by the CI generation unit 204 into a PSI transmission area generated by the PSI generation unit 202, according to the length information detected by the PSI length detection unit 203. The TS multiplexing unit 206 multiplexes the A/V stream 201 and the CI inserted by the CI insertion unit 205, and transmits the multiplexed data.

In more detail, the CI generation unit 204 forms CI by using elementary stream information of all channels which are received by the transmission apparatus.

In this case, the CI has a frame structure as shown in Table 1.

TABLE 1

| Channel ID | The Number of Programs | Program Number | PMT PID | Packet Clock Reference_ (PCR)_PID | The Number of Elementary PIDs | Type of Stream | Elementary PID |
|---|---|---|---|---|---|---|---|
| 5 bits (32 IDs) | 3 bits (8 programs) | 16 bits | 13 bits | 13 bits | 2 bits (4 PIDs) | 8 bits | 13 bits |

Herein, "Channel ID" represents an ID of a physical channel. "The Number of Programs" represents the number of programs included in one physical channel, and "Program Number" represents an identifier for each program. "PMT PID" and "PCR PID" represent PSI of each program. "The Number of Elementary PIDs" represents the number of elementary streams included in each program, the type and PID information of each elementary stream are represented using "Type of Stream" and "Elementary PID" fields, respectively.

Herein, data of three fields, including "Channel ID", "The Number of Programs", and "The Number of Elementary PIDs", are information additionally inserted for CI, and data of the remaining five fields are information inserted into a program association table (PAT) and a program map table (PMT).

Therefore, for example, when a channel is formed as shown in Table 2, CI of the channel is generated as Table 3.

TABLE 2

| | Program Number | PMT PID | PCR PID | Type of Stream | Elementary PID |
|---|---|---|---|---|---|
| Ch 1 | 1 | 10 | 11 | 2 | 11 |
| | | | | 129 | 12 |
| | 2 | 20 | 129 | 129 | 21 |
| Ch 2 | 3 | 30 | 31 | 2 | 31 |
| | | | | 129 | 32 |

TABLE 3

| 1 | 2 | 1 | 10 | 11 | 2 | 2 | 11 | 129 | 12 | 2 | 20 | 129 |
|---|---|---|----|----|---|---|----|-----|----|----|----|-----|
| 1 | 129 | 21 | 2 | 1 | 3 | 30 | 31 | 2 | 2 | 31 | 129 | 32 |

CI generated from Table 2 will now be described with reference to Tables 2 and 3. First, a first number "1" in CI of Table 3 represents a channel ID. That is, the first number "1" means "Ch 1" of Table 2. A second number "2" in Table 3 represents the number of programs, and means that the "Ch 1" includes two programs, which is shown in Table 2. Next, program number "1" is entered, and then PMT ND "10" and PCR PID "11" are sequentially expressed. Then, the number of, elementary PIDs included in program number "1" is entered as "2", and the stream type and PID of each elementary are expressed as "2" and "11", and as "129" and "12".

Next, program number "2" is entered, and then PMT PID "20" and PCR PID "129" are sequentially expressed. Then, the number of elementary PIDs included in program number "1" is entered as "1", and the stream type and PID of the elementary are expressed as "129" and '21".

After information about the first channel ID has been expressed as described above, information about a second channel ID is entered in the same manner.

For reference, in the case of digital multimedia broadcasting (DMB), each channel for satellite and terrestrial waves are formed as shown in Table 4.

TABLE 4

|  | Satellite DMB | Terrestrial DMB |
|---|---|---|
| Channel ID | 27 | 6 |
| The Number of Programs | 1 | 3~7 |
| The Number of Elementary PIDs | 1~27 | 1~27 |
| Maximum Size of CI | 2538 bits | 3660 bits |
| Minimum Size of CI | 2334 bits | 2063 bits |

"Channel ID", "The Number of Programs", and "The Number of Elementary PIDs", which are additionally included for flexible construction of CI, are formed with five, three, and two bits, respectively, so as to express maximum of 27, 7, and 2 for the number of IDs, programs, and PIDs, respectively. When the channel property is changed, the above bit numbers may be changed.

The maximum size of CI is calculated by the maximum number of elementary PIDs forming the PMT and the maximum number of PMTs forming the PAT, and the minimum size of CI is a number obtained by considering both 27 satellite DMB channels and 6 terrestrial DMB channels. Therefore, it can be noted that 292 bytes for satellite DMB and 258 bytes for terrestrial DMB are enough to express data for all channel information in the current DMB system.

The PSI length detection unit 203 receives a PSI TS generated by the PSI generation unit 202, and extracts a length value of valid data among all 188 bytes by using the value of an area length field in the PSI area. Then, the PSI length detection unit 203 provides the extracted length value of valid data to the CI insertion unit 205.

The CI insertion unit 205 divides CI generated by the CI generation unit 204 into proper sizes by using the length value of valid data provided from the PSI length detection unit 203, and inserts the divided CI into the PSI TS.

FIGS. 3A to 3D are block diagrams for explaining CI insertion in a digital broadcasting transmission apparatus for rapid channel change according to the first embodiment of the present invention.

When there is a TS including different PSI area data 302 and 305, as shown in FIG. 3A, the CI insertion unit 205 divides CI 307, generated as shown in FIG. 3B, into two pieces of data 307-1 and 307-2, as shown in FIG. 3C, based on length information detected through the PSI length detection unit 203, and inserts the divided CI data 307-1 and 307-2 into invalid areas 303 and 306 of the PSI TS, as shown in FIG. 3D, respectively, so as to transmit the divided CI data 307-1 and 307-2 with the PSI TS.

FIG. 2B is a block diagram illustrating the construction of the digital broadcasting reception apparatus for rapid channel change according to the first embodiment of the present invention. The digital broadcasting reception apparatus includes a CI extraction unit 207, a CI parser 208, a PSI parser 211, a CI processing unit 209, and a storage unit 210. The CI extraction unit 207 receives a digital broadcasting TS transmitted from the transmission apparatus and extracts CI from the digital broadcasting TS. The CI parser 208 parses the CI extracted by the CI extraction unit 207. The PSI parser 211 receives the remaining information, except for the CI extracted by the CI extraction unit 207, parses PSI, and outputs an A/V stream. The CI processing unit 209 processes the CI parsed by the CI parser 208. The storage unit 210 stores the CI processed by the CI processing unit 209, so as to transmit the CI to the PSI parser 211 through the CI processing unit 209 when a physical channel change occurs.

That is, the CI extraction unit 207 detects the length of PSI data, in a manner similar to that of the PSI length detection unit 203, and extracts and transmits the remaining portion, except for the data of the detected length, to the CI parser 208.

Then, the CI parser 208 analyzes CI and stores PID information of all channels in the storage unit 210 through the CI processing unit 209. That is, a PID lookup table is formed.

FIG. 4 is a view illustrating a PID lookup table stored in the storage unit of the digital broadcasting reception apparatus for rapid channel change according to the first embodiment of the present invention.

When PID information has been stored as shown in FIG. 4, PID information to be filtered is sent to the PSI parser 211 as soon as a tuner of the reception apparatus operates, so that the PSI parsing time becomes substantially near to zero, thereby achieving rapid channel change.

Figure 5:
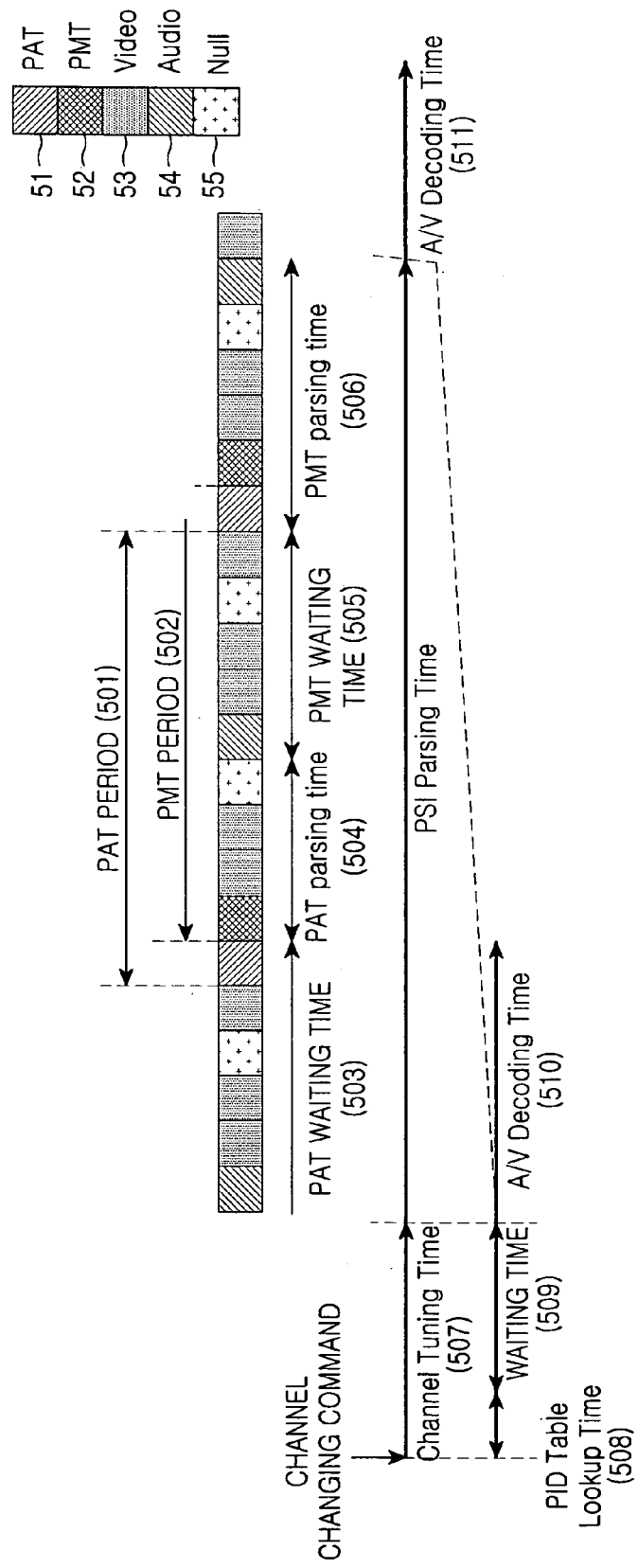
FIG. 5 represents a view for explaining the difference between the channel change method of the present invention and the conventional method employing a decoding scheme.

FIG. 5 is a view explaining the difference between the channel change method of the present invention and the conventional method employing a decoding scheme.

According to the present invention, as soon as a physical channel change command is issued through a tuner, the PID lookup table stored in the storage unit 210 is read, and the value of a PID to be filtered is transmitted to the TS demultiplexing unit, thereby requiring a much shorter time period than the conventional method employing a decoding scheme, so that a time period required for a PSI parsing becomes close to zero.

Figure 6A:
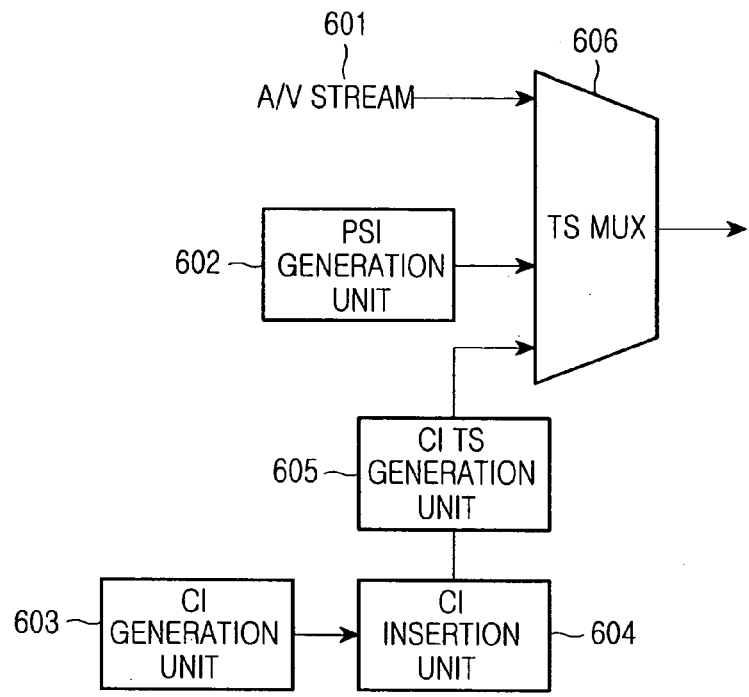
FIGS. 6A and 6B represents block diagrams illustrating the construction of a digital broadcasting transmission/reception apparatus for rapid channel change according to a second embodiment of the present invention.
Figure 6B:
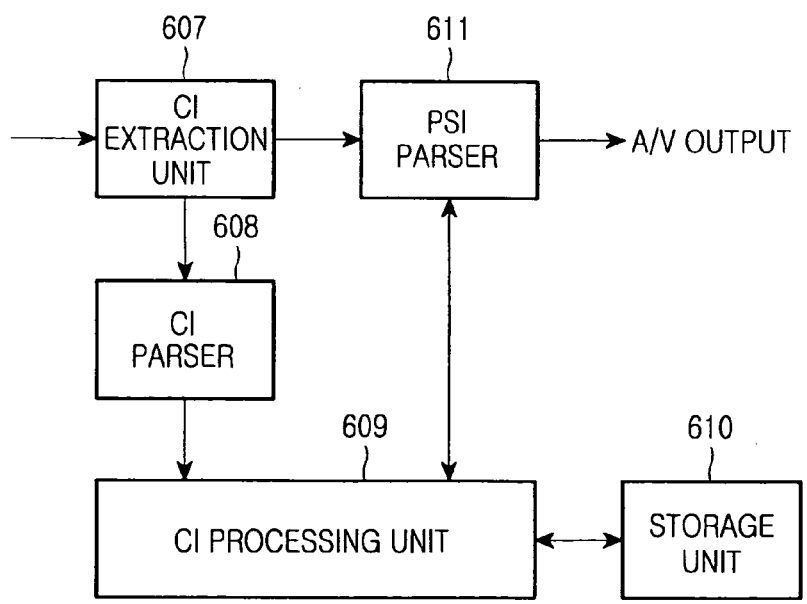

FIGS. 6A and 6B represent block diagrams illustrating the construction of a digital broadcasting transmission and reception apparatus, respectively, for rapid channel change according to a second embodiment of the present invention.

FIG. 6A is a block diagram illustrating the construction of the digital broadcasting transmission apparatus for rapid channel change according to the second embodiment of the present invention. The digital broadcasting transmission apparatus for transmitting an A/V stream 601 of a predetermined channel includes a PSI generation unit 602, a channel information (CI) generation unit 603, a CI insertion unit 604, a CI TS generation unit 605, and a TS multiplexing unit 606. The PSI generation unit 602 generates PSI of the A/V stream 601, and the CI generation unit 603 generates CI including PSI of all digital broadcasting channels which are input to the digital broadcasting transmission apparatus. The CI insertion unit 604 inserts the CI generated by the CI generation unit 603, and the CI TS generation unit 605 generates an independent channel from the CI inserted by the CI insertion unit 604. The TS multiplexing unit 606 multiplexes and transmits the outputs of the A/V stream 601, the PSI generation unit 602, and the CI TS generation unit 605.

According the second embodiment of the present invention, CI can carry information about all channels as an independent channel, instead of an invalid empty space in a PSI TS.

In this case, the CI is allocated with a separate PID, and a reception apparatus senses the corresponding PID and parses the CI stored in a space except for a TS header. Herein, the reception apparatus has the same construction as that shown in FIG. 2B.

As described above, according to the present invention, in order to solve the weak point of a digital television, which requires a longer channel change time than that of an analog television, the digital broadcasting transmission terminal transmits PID information of all channels together with a TS for each channel based on the fact that the PID of digital broadcast streams of each broadcasting station are constantly maintained, so that it is possible to rapidly achieve a channel change.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A digital broadcasting transmission apparatus to allow for a rapid channel change from a digital broadcasting physical channel to another digital broadcasting physical channel, the digital broadcasting transmission apparatus comprising:

a program specific information (PSI) generation unit for generating PSI of an audio/video (A/V) stream of a single digital broadcasting physical channel; a PSI length detection unit for detecting a length of the PSI generated by the PSI generation unit;

a channel information (CI) generation unit for generating CI which includes PSI of a plurality of digital broadcasting physical channels input to the digital broadcasting transmission apparatus, wherein the plurality of digital broadcasting channels are simultaneously broadcasted and one of the plurality of digital broadcasting physical channels is selectively outputted through a tuner of a digital broadcasting reception apparatus;

a CI insertion unit for dividing and inserting the CI into a PSI transmission area according to the length information of the PSI; and a transport stream (TS) multiplexing unit for multiplexing the A/V stream and an output of the CI insertion unit into a digital broadcasting TS of the single digital broadcasting physical channel and outputting the digital broadcasting TS of the single digital broadcasting physical channel, wherein the digital broadcasting TS of the single digital broadcasting physical channel contains the PSI of each channel of the plurality of physical channels simultaneously broadcasted, and wherein a quantity of the plurality of physical channels is greater than two physical channels.

2. The digital broadcasting transmission apparatus as claimed in claim 1, wherein the CI generation unit forms CI by using elementary stream information of all digital broadcasting physical channels received by the digital broadcasting transmission apparatus.

3. The digital broadcasting transmission apparatus as claimed in claim 1, wherein the digital broadcasting reception apparatus has only single tuner and the PSI of the plurality of digital broadcasting channels are provided to the single tuner.

4. The digital broadcasting transmission apparatus as claimed in claim 1, wherein the CI comprises IDs of the plurality of digital broadcasting physical channels, a total number of programs included in one digital broadcasting physical channel, an identifier for each program, a program map table (PMT) packet identifier (PID), a program clock reference (PCR) PID, a total number of elementary streams included in each program, and type and PID information of each elementary stream.

5. A digital broadcasting transmission apparatus to allow for a rapid channel change from a digital broadcasting physical channel to another digital broadcasting physical channel, the digital broadcasting transmission apparatus comprising:

a program specific information (PSI) generation unit for generating PSI of an audio/video (A/V) stream of a single digital broadcasting physical channel;

a PSI length detection unit for detecting a length of the PSI generated by the PSI generation unit;

a channel information (CI) generation unit for generating CI which includes PSI of a plurality of digital broadcasting physical channels input to the digital broadcasting transmission apparatus, one of the plurality of digital broadcasting physical channels being selectively outputted through a tuner of a digital broadcasting reception apparatus;

a CI insertion unit for dividing and inserting the CI into a PSI transmission area according to the length information of the PSI; and a transport stream (TS) multiplexing unit for multiplexing the A/V stream and an output of the CI insertion unit into a digital broadcasting TS of the single digital broadcasting physical channel and outputting the digital broadcasting TS of the single digital broadcasting physical channel; wherein the digital broadcasting TS of the single digital broadcasting physical channel contains the PSI of each channel of the plurality of physical channels;

wherein the CI generation unit forms CI by using elementary stream information of all digital broadcasting physical channels received by the digital broadcasting transmission apparatus; and wherein the CI has a frame structure as follows:

| Channel ID | The Number of Programs | Program Number | PMT PID | PCR PID | The Number of Elementary PIDs | Type of Stream | Elementary PID |
|---|---|---|---|---|---|---|---|
| 5 bits (32 IDs) | 3 bits (8 programs) | 16 bits | 13 bits | 13 bits | 2 bits (4 PIDs) | 8 bits | 13 bits | wherein "Channel ID" represents an ID of a digital broadcasting physical channel, "The Number of Programs" represents the number of programs included in one digital broadcasting physical channel, "Program Number" represents an identifier for each program, "PMT PID" ("Program Map Table" "Packet Identifier") and "PCR PID" ("Program Clock Reference" "Packet Identifier") represent PSI of each program, "The Number of Elementary PIDs" represents the number of elementary streams included in each program, and a type and packet identifier (PID) information of each elementary stream are represented using "Type of Stream" and "Elementary PID" fields, respectively.

6. The digital broadcasting transmission apparatus as claimed in claim 1, wherein the PSI length detection unit receives a PSI TS generated by the PSI generation unit, and extracts a length value of valid data among all 188 bytes by using the length value of an area length field in a PSI area, thereby detecting a length of the PSI.

7. The digital broadcasting transmission apparatus as claimed in claim 1, wherein the CI insertion unit divides the CI generated by the CI generation unit in accordance with a size of an extra area of a PSI TS by using a length value of valid data provided from the PSI length detection unit, and then inserts the divided CI into the extra area of the PSI TS.

8. A digital broadcasting reception apparatus for rapid channel change from a digital broadcasting physical channel to another digital broadcasting physical channel in a digital broadcasting system in which channel information (CI) is received, the digital broadcasting reception apparatus comprising:
 a tuner for selectively outputting one of a plurality of digital broadcasting transport streams (TSs) transmitted from a digital broadcasting transmission apparatus, the plurality of TSs corresponding to a plurality of digital broadcasting physical channels respectively, wherein the plurality of digital broadcasting channels are simultaneously broadcasted;
 a CI extraction unit for extracting the CI from the digital broadcasting TS of a single digital broadcasting physical channel received through the tuner, the CI including program specific information (PSI) of the plurality of digital broadcasting physical channels;
 a CI parser for parsing the CI extracted by the CI extraction unit;
 a program specific information (PSI) parser for receiving remaining information, except for the CI extracted by the CI extraction unit, parsing PSI, and outputting an A/V stream;
 a CI processing unit for processing the CI parsed by the CI parser; and
 a storage unit for storing the CI processed by the CI processing unit as a PSI lookup table,
 wherein the CI processing unit retrieves the PSI lookup table stored in the storage unit and transmits the PSI lookup table to the PSI parser when there is a digital broadcasting physical channel change through the tuner; and
 wherein the digital broadcasting TS of the single digital broadcasting physical channel received through the tuner contains the PSI of each channel of the plurality of physical channels simultaneously broadcasted, and
 wherein a quantity of the plurality of physical channels is greater than two physical channels.

9. The digital broadcasting reception apparatus as claimed in claim 8, wherein the CI extraction unit detects a length of a PSI area from the digital broadcasting TS received through the tuner, extracts a remaining portion, except for the detected length, as CI data, and transmits the detected CI data to the CI parser.

10. The digital broadcasting reception apparatus as claimed in claim 8, wherein the CI parser analyzes the CI and transmits a result of the analysis to the CI processing unit so as to store packet identifier (PID) information of all digital broadcasting physical channels in the storage unit through the CI processing unit.

11. A digital broadcasting transmission apparatus providing for rapid channel change from a digital broadcasting physical channel to another digital broadcasting physical channel, the digital broadcasting transmission apparatus comprising:
 a program specific information (PSI) generation unit for generating PSI of an audio/video (A/V) stream of a single digital broadcasting physical channel;
 a channel information (CI) generation unit for generating CI which includes PSI of a plurality of digital broadcasting channels input to the digital broadcasting transmission apparatus, wherein the plurality of digital broadcasting channels are simultaneously broadcasted and one of the plurality of digital broadcasting physical channels is selectively outputted through a tuner of a digital broadcasting reception apparatus;
 a CI insertion unit for inserting the CI generated by the CI generation unit;
 a CI transport stream (CI TS) generation unit for generating a CI TS from the CI inserted by the CI insertion unit; and
 a TS multiplexing unit for multiplexing outputs of the A/V stream, the PSI generation unit, and the CI TS generation unit into a digital broadcasting TS of the single digital broadcasting physical channel and outputting the digital broadcasting TS of the single digital broadcasting physical channel;
 wherein the digital broadcasting TS of the single digital broadcasting physical channel contains the PSI of each channel of the plurality of physical channels simultaneously broadcasted; and
 wherein a quantity of the plurality of physical channels is greater than two physical channels.

12. The digital broadcasting transmission apparatus as claimed in claim 11, wherein the CI TS generation unit forms CI by using elementary stream information of all channels received by the digital broadcasting transmission apparatus.

13. A digital broadcasting transmission apparatus providing for rapid channel change from a digital broadcasting physical channel to another digital broadcasting physical channel, the digital broadcasting transmission apparatus comprising:
 a program specific information (PSI) generation unit for generating PSI of an audio/video (A/V) stream of a single digital broadcasting physical channel;
 a channel information (CI) generation unit for generating CI which includes PSI of a plurality of digital broadcasting channels input to the digital broadcasting transmission apparatus, one of the plurality of digital broadcasting physical channels being selectively outputted through a tuner of a digital broadcasting reception apparatus;
 a CI insertion unit for inserting the CI generated by the CI generation unit;
 a CI transport stream (CI TS) generation unit for generating a CI TS from the CI inserted by the CI insertion unit; and
 a TS multiplexing unit for multiplexing outputs of the A/V stream, the PSI generation unit, and the CI TS generation unit into a digital broadcasting TS of the single digital broadcasting physical channel and outputting the digital broadcasting TS of the single digital broadcasting physical channel;
 wherein the digital broadcasting TS of the single digital broadcasting physical channel contains the PSI of each channel of the plurality of physical channels;
 wherein the CI TS generation unit forms CI by using elementary stream information of all channels received by the digital broadcasting transmission apparatus; and
 wherein the CI has a frame structure as follows:

| Channel ID | The Number of Programs | Program Number | PMT PID | PCR PID | The Number of Elementary PIDs | Type of Stream | Elementary PID |
|---|---|---|---|---|---|---|---|
| 5 bits (32 IDs) | 3 bits (8 programs) | 16 bits | 13 bits | 13 bits | 2 bits (4 PIDs) | 8 bits | 13 bits | wherein "Channel ID" represents an ID of a digital broadcasting physical channel, "The Number of Programs" represents the number of programs included in one digital broadcasting physical channel, "Program Number" represents an identifier for each program, "PMT PID" ("Program Map Table" "Packet Identifier") and "PCR PID" ("Program Clock Reference" "Packet Identifier") represent PSI of each program, "The Number of Elementary PIDs" represents the number of elementary streams included in each program, and a type and packet identifier (PID) information of each elementary stream are represented using "Type of Stream" and "Elementary PID" fields, respectively.

* * * * *